United States Patent Office 2,707,179
Patented Apr. 26, 1955

2,707,179

ORGANO POLYSILOXANE COMPOSITIONS CONTAINING AN ETHANOLAMINE AND BENZOYL PEROXIDE AND THEIR MANUFACTURE

Pierre Pascal Peyrot, Lyon, and Louis Jean Dumoulin, S/Dorlay, France, assignors to Societe des Usines Chimiques Rhone Poulenc, Paris, France No Drawing. Application January 21, 1952,
Serial No. 267,505

Claims priority, application Great Britain
January 24, 1951

8 Claims. (Cl. 260—46.5)

The present invention relates to novel organopolysiloxane compositions which are capable of being moulded rapidly, for example, in a few minutes, under pressure at temperatures as low as 150° C. to 170° C. and which are nevertheless stable for storage purposes even for several months, i. e. which have a long shelf-life.

The development of organopolysiloxane compositions for moulding purposes has heretofore been hindered by the lack of availability of compositions which possess both prolonged shelf-life and the capability of being moulded under conditions of sufficient rapidity. Said conditions are such as usually obtain in the thermosetting resin field, where there are available stable moulding powders e. g. of the phenolaldehyde type, which have been subjected to a preliminary partial condensation treatment, or "advancement," i. e. powders which are in the "A" or "resole" stage and which may be molded in a matter of a few minutes by heating in the region of 160°–170° C. It is, moreover, essential from an economic point of view that, in moulding processes of the kind described, the moulded articles may be removed from the mould while still hot in order to keep the moulding cycle to a minimum time and that the articles have, at the temperature at which they are removed from the mould, an adequate strength such that on removal from the mould no deformation or other mechanical flaws occur.

It has now been found that the simultaneous addition of suitable quantities of ethanolamines and benzoyl peroxide to polysiloxane resins, especially methyl and methylphenyl polysiloxane resins, enables mixtures to be obtained which are stable at ordinary temperature for several months, are capable of being moulded in times as short as 5 minutes at 170° C., for an article of, for example, 5 mm. thickness and of removal from the mould while still hot with adequate mechanical strength.

Accordingly, the present invention provides a moulding composition stabilised against deterioration during storage which comprises a polysiloxane resin containing from 0.25 per cent to 4 per cent of its weight of one or more ethanolamines and from 1 per cent to 6 per cent of its weight of benzoyl peroxide.

The invention is especially advantageous when applied to methyl polysiloxane resins and methylphenyl polysiloxane resins. These can be prepared by the usual processes of hydrolysis of hydrolysable methyl or methylphenylchlorosilanes. The methyl or methylphenyl polysiloxane resins employed in the production of moulding compositions according to the present invention are preferably those in which the ratio of the number of methyl or methyl and phenyl groups to the number of silicon atoms in the resin, i. e. the "substitution ratio," is less than 1.4 and preferably between 1.0 and 1.25. They may be employed either without solvent or in solution in organic solvents. The resin may be employed without solvent only when its nature permits the evaporation of the solvent used in its preparation and the isolation of the resin in the dry state without the intermediate formation of an infusible and insoluble gel.

The benzoyl peroxide can be used in the form of the solid, in which case it is added to the solution of polysiloxane resin in a solvent capable of dissolving it. It can equally well be used in solution in a solvent which should itself be a solvent for the resin or miscible with the previously prepared resin solution. The quantity of benzoyl peroxide must be in the range of 1 per cent to 6 per cent, calculated on the weight of the dry resin. As the ethanolamines there can be used monoethanolamine, diethanolamine or triethanolamine or a mixture of two or more of these amines. They are used, like the benzoyl peroxide, in the pure state or in solution so that there is eventually obtained a homogeneous solution containing one or more ethanolamines in a proportion of 0.25 per cent to 4 per cent on the weight of dry resin, together with one or more solvents, the polysiloxane resin and the benzoyl peroxide. The mixture of the resin with the benzoyl peroxide and the ethanolamine is then subjected to preliminary heating at moderate temperature in order to bring about partial condensation of the resin thereby to give it a sufficiently high viscosity to prevent expulsion from the mould by moulding pressure, while maintaining a sufficient degree of plasticity so that, under moulding pressure, it fills all the details of the mould cavities. The temperature and duration of this preliminary operation will depend upon the moulding pressure and temperature to be employed.

Satisfactory results are generally obtained with preliminary heat treatments of about a few minutes to a few hours at 100° C. or less, varying according to the nature of the resin and the thickness of the mass. It is also possible to operate at higher temperature by correcting accordingly the duration of the treatment. However, as the temperature increases, the duration of the treatment should be watched more carefully, since too prolonged heating can lead to a resin which is too far condensed and, therefore, impossible to mould subsequently. When the resin is used in an organic solvent solution the elimination of the solvent may be effected during the preliminary heat treatment.

It will be understood that these mouldable polysiloxane compositions may contain variable proportions of different fillers or the like for the purpose of reducing the cost price or for improving the mechanical properties. For example, it is possible to add heat resistant mineral pigments, anti-adhesion agents or fillers, such as, mica powder, titanium oxide, aluminium oxide, powdered talc, steatites, metallic titanates, glass fibres, asbestos and, in general, any convenient material which will withstand the high temperature to which the compositions are subjected.

Moulding of the composition can be carried out under the conditions generally used in the field of thermo-setting resins, i. e. at temperatures of the order of 160°–170° C. for pressures varying from 50–500 kg./sq. cm.

After moulding, it may be desirable, in accordance with a technique frequently employed for organopolysiloxane derivatives, to reheat the compositions in a furnace or oven at normal pressure; for example, a progressive reheating to or above 250° C. may be employed.

In some cases it is advantageous to add to the ethanolamines a mineral or organic acid, such as sulphuric acid or abietic acid, in a small amount, for example 0.1 to 0.8 mol of acid per mol of ethanolamine. This addition has the effect of retarding the bodying of the resin during the preliminary heating, thereby retaining its ability to be moulded afterwards. This advantage is especially marked when diethanolamine or monoethanolamine is used instead of triethanolamine.

These compositions give mouldings which resist very high temperatures (250° C. or more) and humidity and have good electrical properties irrespective of the nature of the charge they contain and this makes them useful in electro-technology as insulators for high and low frequencies.

The following examples, in which the parts are understood to be by weight, are given to illustrate the invention.

*Example I*

There is poured into water an ethereal solution of a mixture of methylchlorosilanes having a CH₃/Si ratio of 1.25 in accordance with the usual hydrolysis technique for these products. The aqueous layer is poured off, the ethereal layer is washed in water and then, by progressively replacing the ether by toluene, the resin is separated out in the form of a 60% solution by weight in the toluene.

To 61 parts of the resin solution thus obtained, there are added 1.6 parts of commercially available benzoyl peroxide which contains 12% of water, and both are then mixed in a mixer with 40 parts of degreased glass fibres, 20 parts titanium oxide and 2 parts triethanolamine in a 50% solution in isopropyl alcohol.

After 1½ hours mixing, the above mass is homogeneous. The solvent is eliminated by evaporation in an oven at 100° C. for 45 minutes. This operation simultaneously effects a partial condensation of the resin. There is obtained a dry granular mass which is stable on storage.

The product, after heating in a mould for 5 minutes at 170° C. under a pressure of 300 kg./cm.² with a thickness of about 3 mm., is quite hard enough to be removed from the mould in the hot state, without being deformed. After being stored for 40 days, it moulds as well as immediately after its manufacture.

*Example II*

30 parts of benzoyl peroxide containing 12% of water are dissolved, with agitation, in 1525 parts of the organopolysiloxane resin described in Example I. 30 parts of a 50% solution of triethanolamine in isopropyl alcohol are added to this solution. The resulting solution is then uniformly dispersed in a mixer with 1000 parts of glass fibres and 500 parts of titanium oxide. When the mixture has been homogenised in the mixer it is dried in an oven for 45 minutes at 100° C. There is obtained a mass which moulds and keeps as well as that of Example I under the same conditions.

*Example III*

To the mixture of polysiloxane resin and benzoyl peroxide prepared according to Example II there are added, with mixing, 40 parts of asbestos fibres, 20 parts of titanium oxide, 2 parts of calcium stearate and 2 parts of triethanolamine as a 10% solution in isopropyl alcohol. After drying for 45 minutes at 100° C. in a ventilated oven, the homogeneous mass so obtained moulds in the same manner as that of Example I.

*Example IV*

There is poured into water an ethereal solution of a mixture of methylchlorosilanes having a CH₃/Si ratio of 1.25 in accordance with the usual hydrolysis technique for these products. The aqueous layer is poured off, the ethereal layer is washed in water and then, by progressively replacing the ether by toluene, the resin is separated out in the form of a 60% solution by weight in the toluene.

Into 1586 parts of this resin there is incorporated:

1000 parts of glass fibre
500 parts of titanium oxide
340 parts of a 7.5% solution of benzoyl peroxide in acetone
50 parts of solution comprising:

|  | Parts |
| --- | --- |
| Colophony resin | 14.3 |
| Heated at 100° C. with— |  |
| Triethanolamine | 9.5 |
| Diethanolamine | 4.7 |
| all dissolved in— |  |
| Methyl alcohol | 21.5 |

The mass thus obtained may be treated and moulded under the same conditions as in the foregoing examples, or even at a temperature of 150° C.

After being stored for more than 2 months, this mass can be moulded under the same conditions and gives the same results as immediately after its preparation.

*Example V*

An organopolysiloxane resin having methyl and phenyl radicals is prepared by co-hydrolysing with water in ethereal solution a mixture containing 33% by weight of methyltrichlorosilane, 7% of dimethyldichlorosilane and 60% of phenyltrichlorosilane, a liquid organopolysiloxane resin containing on an average 1.1 methyl and phenyl groups per atom of silicon. It is washed and the aqueous layer decanted; the ethereal layer is washed and by progressively replacing the ether by toluene the resin is separated in the form of a 60% solution by weight in toluene.

To 80 parts of the resin solution so obtained there are added 1.6 parts of moist benzoyl peroxide (containing 12% water) and it is then mixed in a mixer with 52 parts of unoiled glass fibres, 27 parts of titanium oxide and 24 parts of a solution containing:

|  | Parts |
| --- | --- |
| Colophony resin | 0.6 |
| Heated for 4 hours at 100° C. with: |  |
| Triethanolamine | 0.4 |
| Diethanolamine | 0.2 |

After heating for 30 minutes at 100° C. there is obtained a mass which moulds under the same conditions as in Example I. After 3 months' storage it moulds equally well.

*Example VI*

1.2 parts of benzoyl peroxide containing 12% of water are dissolved in 61 parts of a toluene solution of a methyl polysiloxane resin identical with that of Example I. It is mixed in a mixer with 20 parts of titanium oxide and 40 parts of glass fibre. There are then added 0.75 part of colophony and 0.75 part of triethanolamine which has been heated previously for 2 hours at 100° C. and dissolved in 1.5 parts of methanol. The homogeneous mass so obtained is dried for 2 hours at 100° C. in a ventilated oven. After cooling it can be moulded and keeps like the product prepared in accordance with Example I.

*Example VII*

1.2 parts of benzoyl peroxide containing 12% of water are dissolved in 61 parts of a resin identical with that described in Example V. It is mixed in the mixer with 20 parts of titanium oxide and 40 parts of glass fibre and there are then added 0.2 part of colophony and 0.2 part of triethanolamine previously heated at 100° C. for 2 hours and dissolved in 0.4 part of methanol. The homogeneous product obtained is dried in a ventilated oven for 45 minutes at 100° C.

The mass obtained moulds and keeps like that described in Example I.

*Example VIII*

To the mixture of polysiloxane resin and benzoyl peroxide prepared according to Example VII there are added, with mixing, 30 parts of diatomaceous powdered silica (commercially available under the trade name Celite), 0.5 part of aluminum stearate, 10 parts of titanium oxide, 0.4 part of a 50% solution of colophony in methanol and 0.4 part of a 50% solution of triethanolamine in isopropyl alcohol.

There is obtained a powder which moulds and keeps like the products of the preceding examples.

*Example IX*

There is used a methylpolysiloxane resin in toluene solution identical with that described in Example I. 400 parts of this resin are taken and dispersed in the mixer with 200 parts of methanol, 1000 parts of unoiled glass fibre and 500 parts of titanium oxide. The mixer is heated, first for 1 hour with the cover closed and then for 20 minutes with the cover open to evaporate a large proportion of the solvent. In addition, 30 parts of moist benzoyl peroxide (12% water) are dissolved in 1125 parts of this resin and there are then added 50 parts of a solution of colophony, triethanolamine, diethanolamine and methyl alcohol identical with that described in Example IV. The whole is mixed to a homogeneous mass. This is dried in layers of 1.5 cm. thickness spread out on plates, first for 4 hours at about 100° C. with ventilation. It is then placed in a cold oven and heated. The oven reaches 100° C. in 35 minutes and is kept at 100° C. for 30 minutes. A moulding material is obtained which moulds and keeps like that of Example I.

*Example X*

There is used a methylpolysiloxane resin in toluene solution identical with that described in Example I. 61 parts of this resin are taken and 1.6 parts of benzoyl peroxide containing 12% water dissolved therein. It is mixed in the mixer with 20 parts of powdered aluminium stearate, 0.1 part of sulphuric acid dispersed in 0.9 part of methanol and 0.35 part of diethanolamine dissolved in 0.35 part of methanol. The resin is dried for 45 minutes at 100° C.

It has already been indicated that ethanolamines will accelerate the setting of organopolysiloxane compounds. It is possible to prepare compositions for moulding by starting with polysiloxane resins catalysed by ethanolamines alone or even by other accelerators such as, for example, zinc or lead salts. With sufficiently small amount of catalysts, these masses may keep for a certain time, but require to be moulded under pressure for very long periods, up to one or several hours at 200° C. with cooling of the mould before the article can be removed. If the amount of catalyst is increased, it is possible to produce compositions which can be moulded in shorter periods and which can even be removed from the mould whilst still hot, but these compositions are unstable on storage, and must, therefore, be prepared extemporaneously. In certain cases even, under the intense action of the catalyst, the resin is already too highly polymerised to be capable of being moulded before elimination of the solvent. Under these conditions, the preliminary partial condensation and the rate of catalysis must be maintained within such strict limits for obtaining a suitable flowable mass that these compositions have so far scarcely been used industrially.

By employing simultaneously triethanolamine and benzoyl peroxide, on the contrary, there is provided a great tolerance in the preliminary condensation and in the moulding operation, while also securing the possibility of being able to vary the relative proportions of these two catalysts within sufficiently large limits.

In order to show the advantages resulting from the simultaneous use of triethanolamine and benzoyl peroxide, the following series of tests have been carried out.

If, in Example I, the benzoyl peroxide is omitted and the mass is dried for 45 minutes at 100° C., the mass is no longer mouldable. The grains are no longer fusible and no longer agglomerate under pressure.

If this same mass is dried for only 15 minutes at 100° C., it still contains a high proportion of solvent, the powder agglomerates under pressure, but the flowability is insufficient. This same mass, after being stored for 3 days, can no longer be moulded, the grains being no longer sufficiently fusible.

If, still in the absence of benzoyl peroxide, the amounts of triethanolamine are reduced to half those mentioned in Example I, and if drying is carried out for 45 minutes at 100° C., the powder melts insufficiently and the grains are badly agglomerated.

With an amount of triethanolamine reduced to a quarter of that of Example I, the limit of the possibility of agglomeration is reached; the flowability is still very inadequate. This mass, after storing for 8 days, is no longer mouldable and the grains are no longer sufficiently fusible for them to agglomerate.

By reducing still further the amount of triethanolamine to ⅛ of that of Example I, after 45 minutes at 100° C., the flowability of the powder is scarcely sufficient and, moreover, it is too soft in the hot state for it to be removed from the mould without deformation.

If, in Example I, the triethanolamine is omitted while retaining the benzoyl peroxide, and the mass is partially condensed by heating for 45 minutes at 100° C., there is produced a soft and sticky product which is not capable of being moulded. If it is dried for 2 hours at 100° C., the product is too fluid and is expelled from the mould. If it is dried for 30 minutes at 150° C., the product is almost entirely expelled from the mould during moulding. The residue left in the mould is completely soft under heat and hardens on cooling.

Finally, if the benzoyl peroxide is omitted from Example III there is obtained a mass which is on the limit of moulding capacity, that is to say it will not fill all the fine cavities of a mould of slightly complicated form and it can only be used for moulds of simple form. On the other hand, the powder of Example III flows perfectly into all the sinuosities of the moulds but on removal from the mould it remains as hard as that containing no benzoyl peroxide.

It would seem, contrary to expectations, that the benzoyl peroxide functions at ordinary temperature to inhibit the catalytic actions of the triethanolamine but does not interfere therewith at higher temperatures (150°–170° C., for example). Finally, it is to be noted that, by replacing the benzoyl peroxide by benzoic acid, a powder is obtained which does not flow and is not mouldable.

We claim:

1. A moulding composition stabilised against deterioration during storage which comprises a member selected from the class consisting of methyl and methylphenyl polysiloxane resins wherein the ratio of the number of organic substituent groups to the number of silicon atoms in the resin is between 1.4:1 and 1:1, said composition containing from 0.25 per cent to 4 per cent of at least one ethanolamine in which the amino nitrogen is substituted only by ethanol and from 1 per cent to 6 per cent of benzoyl peroxide, based on the weight of resin.

2. A moulding composition according to claim 1 wherein the ratio of the number of organic substituent groups to the number of silicon atoms in the resin is between 1.0 and 1.25.

3. A moulding composition stabilised against deterioration during storage which comprises a member selected from the class consisting of methyl and methylphenyl polysiloxane resins wherein the ratio of the number of organic substituent groups to the number of silicon atoms in the resin is between 1.4:1 and 1:1, said composition containing from 0.25 per cent to 4 per cent of at least one ethanolamine in which the amino nitrogen is substituted only by ethanol, from 1 per cent to 6 per cent of benzoyl peroxide, based on the weight of resin, and 0.1 to 0.8 mol of acid per mol of ethanolamine.

4. A moulding composition stabilised against deterioration during storage which comprises a member selected from the class consisting of methyl and methylphenyl polysiloxane resins wherein the ratio of the number of organic substituent groups to the number of silicon atoms in the resin is between 1.4:1 and 1:1, said composition containing from 0.25 per cent to 4 per cent of diethanolamine, from 1 per cent to 6 per cent of benzoyl peroxide, based on the weight of resin, and 0.1 to 0.8 mol of acid per mol of diethanolamine.

5. A moulding composition stabilised against deterioration during storage which comprises a member selected from the class consisting of methyl and methylphenyl polysiloxane resins wherein the ratio of the number of organic substituent groups to the number of silicon atoms in the resin is between 1.4:1 and 1:1, said composition containing from 0.25 per cent to 4 per cent of monoethanolamine, from 1 per cent to 6 per cent of benzoyl peroxide, based on the weight of resin, and 0.1 to 0.8 mol of acid per mol of monoethanolamine.

6. A moulding composition stabilised against deterioration during storage which comprises a methyl polysiloxane resin of $CH_3:Si$ ratio between 1.4:1 and 1:1, containing from 0.25 per cent to 4 per cent of diethanolamine, from 1 per cent to 6 per cent of benzoyl peroxide, based on the weight of resin, and 0.1 to 0.8 mol of acid per mol of diethanolamine.

7. A method of stabilising against deterioration during storage a polysiloxane resin selected from the class consisting of methyl and methylphenyl polysiloxane resins wherein the ratio of the number of organic substituent groups to the number of silicon atoms in the resin is between 1.4:1 and 1:1, which comprises incorporating in the resin from 0.25 per cent to 4 per cent of at least one ethanolamine in which the amino nitrogen is substituted only by ethanol, and from 1 per cent to 6 per cent of benzoyl peroxide, based on the weight of resin.

8. A method of stabilising against deterioration during storage a polysiloxane resin selected from the class consisting of methyl and methylphenyl polysiloxane resins wherein the ratio of the number of organic substituent groups to the number of silicon atoms in the resin is between 1.4:1 and 1:1 which comprises incorporating in the resin from 0.25 per cent to 4 per cent of at least one ethanolamine in which the amino nitrogen is substituted only by ethanol, and from 1 per cent to 6 per cent of benzoyl peroxide, based on the weight of resin and heating to moderate temperatures to cause partial condensation after incorporating the ethanolamine and benzoyl peroxide.

References Cited in the file of this patent

UNITED STATES PATENTS

| | | |
|---|---|---|
| 2,389,807 | McGregor | Nov. 27, 1945 |
| 2,481,052 | Warrick | Sept. 6, 1949 |

(Other references on following page)

UNITED STATES PATENTS

| | | |
|---|---|---|
| 2,492,498 | Pederson | Dec. 27, 1949 |
| 2,517,777 | Fenn et al. | Aug. 8, 1950 |
| 2,528,606 | Pederson | Nov. 7, 1950 |
| 2,620,317 | Johannson | Dec. 2, 1952 |

FOREIGN PATENTS

| | | |
|---|---|---|
| 658,979 | Great Britain | Oct. 17, 1951 |

OTHER REFERENCES

Chicago Club, Official Digest, Nov. 1945, pages 424, 428, 430 and 440.

Jervis et al.: The Chemical Age, Aug. 9, 1947, vol. 57, pages 187–188.